United States Patent
Takeda et al.

(10) Patent No.: US 8,020,945 B2
(45) Date of Patent: Sep. 20, 2011

(54) WHEEL FOR VEHICLE

(75) Inventors: Kazuo Takeda, Aichi-ken (JP); Tatsuya Oba, Aichi-ken (JP); Tetsuya Arakawa, Aichi-ken (JP); Koji Murakami, Obu (JP); Kazuki Yamazaki, Yamato (JP)

(73) Assignees: Toyoda Gosei Co., Ltd., Aichi-pref. (JP); Topy Kogyo Kabushiki Kaisha, Tokyo (JP)

( * ) Notice: Subject to any disclaimer, the term of this patent is extended or adjusted under 35 U.S.C. 154(b) by 112 days.

(21) Appl. No.: 12/155,246

(22) Filed: May 30, 2008

(65) Prior Publication Data
US 2008/0303338 A1  Dec. 11, 2008

(30) Foreign Application Priority Data
Jun. 8, 2007 (JP) ................................ 2007-153038
Jul. 17, 2007 (JP) ................................ 2007-186238

(51) Int. Cl.
B60B 7/06 (2006.01)
(52) U.S. Cl. .......... 301/37.371; 301/37.102; 301/37.108
(58) Field of Classification Search ............. 301/37.101, 301/37.102, 37.371, 37.35, 37.29, 37.28, 301/37.106, 37.107, 37.108, 37.109, 37.41, 301/37.42, 37.43
See application file for complete search history.

(56) References Cited

U.S. PATENT DOCUMENTS

| | | | |
|---|---|---|---|
| 2,083,066 A * | 6/1937 | Hunt | 301/63.101 |
| 2,149,113 A * | 2/1939 | Buss | 301/12.1 |
| 2,154,932 A * | 4/1939 | Gannett | 301/19 |
| 2,181,364 A * | 11/1939 | Burger | 301/13.1 |
| 5,577,809 A | 11/1996 | Chase | |
| 5,803,552 A | 9/1998 | Kato et al. | |
| 6,439,671 B1 * | 8/2002 | Lehnhardt et al. | 301/84 |
| 6,450,582 B2 | 9/2002 | Ichikawa et al. | |
| 6,663,189 B2 | 12/2003 | Enomoto et al. | |
| 7,055,915 B2 * | 6/2006 | Fitzgerald | 301/37.106 |
| 7,562,939 B2 * | 7/2009 | Zanin | 301/37.372 |
| 7,784,185 B2 * | 8/2010 | Murray | 29/894.381 |
| 2003/0047987 A1 | 3/2003 | Enomoto et al. | |

FOREIGN PATENT DOCUMENTS

| | | |
|---|---|---|
| DE | 3704384 A1 * | 8/1988 |
| JP | A-2002-079801 | 3/2002 |
| JP | A-2006-116984 | 5/2006 |
| JP | A-2006-116985 | 5/2006 |

OTHER PUBLICATIONS

Office Action dated Nov. 20, 2009 from Chinese Patent Office in corresponding CN application No. 2008101106084 (and English translation).

* cited by examiner

*Primary Examiner* — Kip Kotter
(74) *Attorney, Agent, or Firm* — Posz Law Group, PLC

(57) ABSTRACT

A wheel for vehicle includes a wheel body, a decorated member, and a visible space. The wheel body has a rim, a hub, and a plurality of spokes connecting the hub and the rim. The decorated member is made from resin, is disposed on a surface of at least one of the spokes, and is retained to the wheel body. The visible space is disposed between the decorated member and the one of the spokes at least, exhibits a height in an axial direction of the wheel body, and is visible from an axial outer side of the wheel body.

6 Claims, 13 Drawing Sheets

WHEEL FOR VEHICLE

The present invention is based on Japanese Patent Application No. 2007-153,038, filed on Jun. 8, 2007, and on Japanese Patent Application No. 2007-186,238, filed on Jul. 17, 2007, the entire contents of which are incorporated herein by reference.

BACKGROUND OF THE INVENTION

1. Field of the Invention

The present invention relates to a wheel for vehicle. More specifically, it relates to a wheel for a vehicle, which comprises a wheel body, and a decorated (or decorative) member that is made from resin.

2. Description of the Related Art

For the purpose of improving mileage (or fuel economy), many wheels have been made from light alloys, such as aluminum alloy and magnesium alloy. Automotive tires have been installed to wheels to use. For example, such a conventional wheel that has been made from light alloy comprises a rim, and a disk. Moreover, such a conventional wheel has been provided with decorative openings, which are formed in the disk, not only to achieve making it more lightweight but also to intend to upgrade the decorativeness and improve the cooling efficiency. Note that the term, "decorative opening," means "vent hole" that wheel manufactures have been using usually. Hence, it is possible hereinafter to reword the term as "decorative vent hole" or simply as "vent hole."

It has been a general practice for the makers of light-alloy wheels to let their wheel bodies alone express decorativeness, without using any wheel cap, but by making use of metallic gloss. However, when letting a wheel body alone express decorativeness, it is uneconomical if the wheel body, especially its decorative surface, is damaged, because the entire wheel body needs to be replaced. Moreover, since specific decorations might possibly not satisfy the strength of the wheel properly, it has been difficult to materialize such decorations.

For example, many conventional wheels for vehicle comprise a hub, and spokes that extend radially from the hub, and the above-described decorative openings are often disposed between the spokes. However, when intending to form a decoration, which has a space, between the spokes; and when forming the decoration by casting or machining, the manufacturing cost has gone up because it is necessary to consume a considerable number of man-hour requirements in order to carry out such casting or machining. Moreover, the decoration may result in a drawback in strength.

Meanwhile, Japanese Unexamined Patent Publication (KOKAI) Gazette No. 11-227,402, Japanese Unexamined Patent Publication (KOKAI) Gazette No. 2002-79,801, Japanese Unexamined Patent Publication (KOKAI) Gazette No. 2003-159,901, and Japanese Unexamined Patent Publication (KOKAI) Gazette No. 2005-324,799 propose a decorated light-alloy wheel, which comprises a wheel body, and a decorated member being made from resin and being fitted detachably to the wheel body. For example, in the decorated light-alloy wheel set forth in Japanese Unexamined Patent Publication (KOKAI) Gazette No. 2003-159,901, a dent (or recess) is formed in a surface, which involves the wheel body's spokes; and the decorated member, which is made from resin, is installed replaceably to the dent. Moreover, in the decorated light-alloy wheel set forth in Japanese Unexamined Patent Publication (KOKAI) Gazette No. 2005-324,799, a decorated cover, which is made from resin, is installed replaceably by forming a through hole in the spokes, providing the decorated cover with protrusions protruding therefrom, and fitting the resulting protrusions into the through holes with an elastic bushing being interposed therebetween.

When forming a decoration between the spokes in the conventional wheels, it is possible to think of making such a decoration using those decorated members that are made from resin and are disclosed in the gazettes. However, in the decorated light-alloy wheel set forth in Japanese Unexamined Patent Publication (KOKAI) Gazette No. 2003-159,901, although the dents are effective for making the decorated light-alloy wheel lightweight because the dents are formed in the spokes, the depth of the dents is limited when taking the strength of spokes into consideration. As a result, the conventional decorated light-alloy wheel might be associated with such a problem that it provides wheel designers lower degree of freedom in designing decorations.

Moreover, when providing the aforementioned conventional decorated light-alloy wheels with a decorated member partially, it has been often the case that it is desired to make the surface of decorated member substantially flush with the surface of wheel body. In this case, the spokes should be thinned out with respect to the decorated member's thickness. Accordingly, the spokes exhibit strength, which has degraded to such an extent. Consequently, this limits the free design of conventional decorated light-alloy wheels.

SUMMARY OF THE INVENTION

The present invention has been developed in view of the aforementioned circumstances. It is therefore an object of the present invention to provide a wheel for vehicle, which offers enhanced degree of freedom in designing decorations, or which enables wheel designers to design decorations freely, while keeping the strength high by means making it possible to dispose a decorated member without ever thinning out the thickness of the wheel body.

Moreover, it is another object of the present invention to provide a wheel for vehicle, which makes it possible to design such a three-dimensional decoration as if a space is formed at an intermediate portion in the spokes.

A wheel for vehicle according to the present invention can solve the aforementioned problems, and comprises:

a wheel body having a rim, a hub, and a plurality of spokes connecting the hub and the rim;

a decorated member being made from resin, being disposed on a surface of at least one of the spokes, and being retained to the wheel body; and a visible space being disposed between the decorated member and the one of the spokes at least, exhibiting a height in an axial direction of the wheel body, and being visible from an axial outer side of the wheel body. In other words, the visible space is formed in the wheel cover design by creating an axial depth space between the decorated member and at least one of the spokes.

Moreover, in the present wheel, it is desirable that at least one of the spokes can have an extended portion; the rim can have a tongue being disposed above the extended portion of at least one of spokes, and protruding diametrically inward; the extended portion of at least one of the spokes, which is placed under the tongue of the rim, can have a dent (or recess) or a through hole; and the decorated member can have an end being fastened to the tongue of the rim. In this case, it is further desirable that the decorated member can further have walls covering both right and left sides of the tongue of the rim.

In addition, another wheel for vehicle according to the present invention can also solve the aforesaid problems, and comprises:

a wheel body having a rim, and a disk being provided with a decorative opening;

a decorated member being made from resin, being retained to the disk of the wheel body at least, and being exposed in the decorative opening of the disk;

the decorated member having an outside member being disposed on an axially outer side of the wheel body, and an inside member being disposed on an axially inner side of the wheel body;

a first fastener for fastening one of the outside member and inside member of the decorated member to the disk of the wheel body;

a second fastener for fastening the other one of the outside member and inside member of the decorated member to the one of the outside member and inside member of the decorated member; and a visible space being disposed between the outside member and inside member of the decorated member, exhibiting a height in an axial direction of the wheel body, and being visible from an axial outer side of the wheel body.

Moreover, still another wheel for vehicle according to the present invention can likewise solve the aforementioned problems, and comprises:

a wheel body having a rim, and a disk being provided with a decorative opening;

a decorated member being made from resin, being retained to the disk of the wheel body at least, and being exposed in the decorative opening of the disk;

the decorated member having an outside member being disposed on an axially outer side of the wheel body, and an inside member being disposed on an axially inner side of the wheel body;

the disk of the wheel body being further provided with an extended portion, which is extended integrally from the wheel body;

the decorated member further having an end, which is fastened to the wheel body so that the outside member and the inside member hold the extended portion of the disk between them; and a visible space being disposed between the outside member and inside member of the decorated member, exhibiting a height in an axial direction of the wheel body, and being visible from an axial outer side of the wheel body.

The present wheel comprises the wheel body, the decorated member, and the visible space. The decorated member is disposed on a surface of at least one of the spokes of the wheel body. The visible space is disposed between the decorated member and the one of the spokes at least, exhibits a height in an axial direction of the wheel body, and is visible from an axial outer side of the wheel body. Therefore, the present wheel can materialize such a three-dimensional decoration as if a space is provided at an intermediate portion in the one of the spokes at least without ever processing the spoke. Moreover, the present wheel can be manufactured with reduced number of man-hour requirements.

Moreover, another wheel according to the present invention comprises the wheel body, and the decorated member that is disposed so as to expose itself in the decorative opening of the wheel body's disk. Accordingly, it is possible to provide the present wheel with the decorated member irrespective of, or independently of, the spokes and rim of the wheel body. Consequently, it is not necessary at all to thin out the wheel body's thickness. Moreover, it is possible for the decorated member to express its own decoration cooperatively with the decoration of the wheel body's disk, that is, with the decorative opening in the disk. All in all, the present wheel not only keeps exhibiting the strength as wheel per se, but also gives wheel designers enhanced degree of freedom in designing decorations.

Meanwhile, another wheel and still another wheel according to the present invention comprises the wheel body, the decorated member that has the outside member and inside member, and the visible space. The visible space is disposed between the outside member and the inside member, exhibits a height in an axial direction of the wheel body, and is visible from an axial outer side of the wheel body. In other words, a visible space is formed inside the decorated member. As a result, the present wheels not only keep exhibiting high strength without ever thinning out the thickness of the wheel body's spokes, but also can demonstrate a distinctive decoration with great three-dimensional effect or appearance.

In short, although another wheel and still another wheel according to the present invention keep exhibiting the strength as wheel per se, they enable wheel designers to design decorations more freely.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
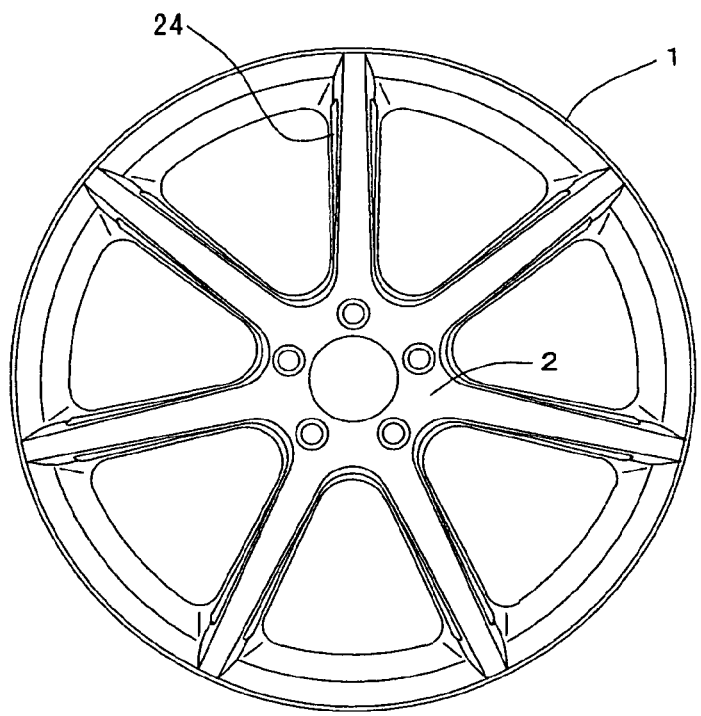
FIG. 1 is a plan-view diagram for illustrating a wheel for vehicle according to Example No. 1 of the present invention.

Having generally described the present invention, a further understanding can be obtained by reference to the specific preferred embodiments which are provided herein for the purpose of illustration only and not intended to limit the scope of the appended claims.

A wheel for vehicle according to the present invention comprises a wheel body, and a decorated member. As for the wheel body, it is possible to use those which are made of light alloys and steels. The light alloys can be aluminum alloys, and magnesium alloys. The wheel body includes a rim on which the bead of tire sits, and a disk. The disk has a decorative opening.

The disk further has a hub, and an outer periphery. The hub is provided with bolt holes. Moreover, the disk furthermore has spokes, meshes or plates, which are usually disposed between the hub and the outer periphery of the disk. Those being provided with spokes are called spoke-type disks. Those being provided with meshes are called mesh-type disks. Those being provided with plates are called dish-type disks. The present wheel comprises the disk, which has a decorative opening. When the present wheel comprises a spoke-type disk, the decorative opening can be disposed between the neighboring spokes. When the present wheel comprises a mesh-type disk, the openings of mesh can make the decorative opening, respectively. When the present wheel comprises a dish-type disk, through holes, which are usually formed in the plate, can make the decorative opening, respectively.

The decorated member is made from resin from the viewpoint of weight saving. The decorated member can desirably be made from hard resin. As for the hard resin, it is possible to exemplify acrylonitrile-butadiene-styrene (ABS) resin, polypropylene (PP) resin, polyamide (PA) resin, Noryl (trademark) resin, and polycarbonate-ABS alloy resin, for instance. Moreover, it is possible to make the decorated member using reinforced resins, which are reinforced with various fillers, such as carbon fibers, glass fibers and ceramic fibers or powders.

As for the method for decorating the decorated member, it is possible to use known methods, such as electroless plating, vapor deposition and coating. The decorated member is provided with a decoration, such as metallic glosses and body-coating colors of vehicle. The decorated member is disposed on a surface of at least one of the spokes. However, it is allowable to prepare a plurality of the decorated members by a quantity of the spokes and dispose them on a surface of all the spokes. Moreover, the decorated member can make an integral decorated member, that is, the decorated member can comprise a disk, which covers a surface of the wheel body's hub, and a plurality of spoke covers, which extend from the disk radially so as to cover the wheel body's spokes.

As for the method for fastening the decorated member to the wheel body, it is possible to employ the following methods:

providing at least one of the spokes with an installation hole, and fastening the decorated member to the installation hole, thereby fastening the decorated member to the wheel body;

providing the rim with a tongue, which protrudes diametrically inward so as to be disposed above an imaginary extension of at least one of the spokes, and fastening the decorated member to the wheel body by way of or with the tongue being interposed therebetween; and providing the decorated member with an cylinder that engages with the rim of the wheel body by providing the rim with a protrusion that extends from the wheel body's rim, fitting or engaging the protrusion into the cylinder, and thereby fastening the decorated member to the wheel body.

In order to fasten the decorated member to the wheel body by way of or with the tongue being interposed therebetween, the following are available:

inserting a bolt, which is disposed to extend from the decorated member, into a through hole, which is formed in the tongue, and tightening the bolt with a nut, which is disposed on a rear surface of the tongue, thereby retaining the decorated member to the wheel body; and inserting an protrusion that engages with the rim of the wheel body and which is disposed to extend from the decorated member, into a through hole, which is formed in the tongue, engaging the protrusion with a rear surface of the tongue, thereby retaining the decorated member to the wheel body.

Note that, in view of processing the wheel body, it is desirable to form a through hole in one of the spokes of the wheel body, which is placed under a tongue, when providing the rim of the wheel body with the tongue.

Moreover, in the case of fastening the decorated member to each of the wheel body's spokes, one of the opposite ends of the decorated member's outer peripheral side (i.e., its outer peripheral end) can be fastened to the wheel body's spokes by way of the above-described tongue, and another one of the opposite ends on the inner peripheral side (i.e., its inner peripheral end) can be fastened to the wheel's hub. When the decorated member's inner peripheral end and outer peripheral end are thus fastened to the wheel body, it is possible to prevent the decorated member from moving relative to the wheel body. Therefore, it is possible to prevent the decorated member from shifting by inhibiting a drawback caused by a centrifugal force, which results from rotating tires during the driving of the vehicle.

In order to fasten the opposite ends of the decorated member on the inner peripheral side (i.e., its inner peripheral end) to the wheel body's hub, it is possible to utilize the following methods:

providing the hub with a tongue, which protrudes from the wheel body's hub, and fastening the decorated member's inner peripheral end to the hub by way of or with the tongue being interposed therebetween in the above-described manner; and bonding the decorated member's inner peripheral end to the wheel body's hub with a double-sided adhesive tape.

The present wheel comprises the visible space. The visible space is disposed between the decorated member and the one of the spokes at least, exhibits a height or depth in an axial direction of the wheel body, and is visible from an axial outer side of the wheel body. The visible space enables the present wheel to materialize such a three-dimensional decoration that a space is formed at an intermediate portion in the one of the spokes at least without ever processing the spoke.

However, it is not preferable that the decorated member's part that installs it to the wheel body is visible in the visible space as seen by the viewer on an axial outer side of the wheel body. Therefore, it is desirable to provide walls, which cover both right and left sides of the tongue of the rim and/or those of the tongue of the hub.

The decorated member can comprise an outside member, and an inside member. The outside member is disposed on an axially outer side of the wheel body. The inside member is disposed on an axially inner side of the wheel body. Considering their weight saving, both of the outside member and inside member are made from resin, and can desirably be made from one of the aforementioned hard resins. Note that it is possible as well to use different types of resins to make the outside member and the inside member, respectively.

Both of the outside member and inside member can desirably be decorated. However, it is more desirable to give a decoration to the outside member's decorative surface, which is visible on the outside of vehicle readily, to a surface of the outside member and/or the inside member, which is exposed in a space that the outside member and inside member form, and to the inside member's side surface, respectively.

A first fastener can fasten one of the outside member and inside member to the disk of the wheel body. It is desirable to construct the first fastener as described below. For example, the first fastener can comprise a plurality of fastening portions, and a plurality of fastened portions; the fastening portions are disposed on one of the outside member and the inside member; the fastened portions are disposed on the wheel body; and the fastening portions engage with the fastened portions respectively, thereby fastening the one of the outside member and the inside member to the wheel body. The thus made first fastener can prevent the decorated member from moving relatively to the wheel body. Therefore, the present wheel can inhibit such a drawback that the decorated member has been shifted to interfere with the spokes of the wheel body by the centrifugal force that arises when tires rotate during the driving of vehicle.

Moreover, a second fastener can fasten the other one of the outside member and inside member to the one of the outside member and inside member. Similarly to the first fastener, the second fastener can desirably comprise a plurality of fastening portions, and a plurality of fastened portions; the fastening portions are disposed on the other one of the outside member and the inside member; the fastened portions are disposed on the one of the outside member and the inside member; and the fastening portions engage with the fastened portions respectively, thereby fastening the outside member to the inside member, or vice versa, integrally.

As the fastening portions and fastened portions, it is possible to use mechanical combinations, such as screw bolts and screwed holes or embedded nuts, pins and pin holes and claws and holes that engage the decorated wheel to the rim of the tire; or bonding means, such as double-sided adhesive tapes and adhesive agents, alternatively.

The first fastener and second faster can desirably be constructed so that the first fastener fastens the outside member and the second fastener fastens the inside member. The thus made first fastener and second fastener can provide the outside member with a larger configuration than that of the inside member, thereby making it possible to hide or mask the boundary between the outside member and the inside member. As a result, the present wheel exhibits upgraded decorativeness.

The present wheel comprises a visible space between the outside member and the inside member. The visible space exhibits a height or depth in an axial direction of the wheel body, and is visible from an axial outer side of the wheel body. It is possible to form such a visible space by having the second fastener fasten the outside member and inside member with a space being provided between the outside member and the inside member. For example, providing the outside member with a pair of legs, which protrude from the outside member's rear surface, and fastening the paired legs' respective leading ends to the inside member making it possible to form a visible space, which exhibits height or depth corresponding to the length of the paired legs, between the outside member and the inside member.

At least the first fastener can preferably be disposed on a more diametrically inward side than the peripheral end of the outside member. The thus disposed first fastener is less likely to be recognized visually when a viewer sees the present wheel's frontal surface from the outside of vehicle. Accordingly, the present wheel exhibits more upgraded decorativeness. Moreover, when at least one of the outside member and inside member is provided with a cover, which covers the first fastener, the cover can make the first fastener at least out of sight. Consequently, the present wheel exhibits much more upgraded decorativeness.

In the first fastener, the fastened portions, which engage with the fastening portions, can be disposed on the hub or spokes of the wheel body. Moreover, the first fasteners can be provided with a tongue or a thinned-out portion, which protrudes from the hub, spokes or rims of the body into the decorative opening of the disk. The tongue or thinned-out portion can make the fastened portions. If such is the case, it is desirable that the outside member or inside member can be constructed so that its peripheral end covers the tongue or thinned-out portion, thereby making the tongue or thinned-out portion less likely to be recognized visually.

In order to hide or mask the tongues or thinned-out portions, which function as the fastened portions, under the outside member or inside member so as to make them invisible when a viewer sees the present wheel on the front side, the tongues or thinned-out portions can desirably be made into a pair of elements facing to each other. Specifically, when the outside member or inside member is formed as an ordinary linear shape, it is desirable to provide the outside member or inside member with the tongues or thinned-out portions, which are placed at positions facing to each other so as to make paired elements in the radial direction and/or peripheral direction of the wheel body. On the other hand, when the outside member or inside member is formed as a curved shape, the tongues or thinned-out portions can desirably be formed as paired elements in a direction along the curve made by the outside member or inside member.

Still another present wheel for vehicle, that is, the above-described third present wheel, has the same constructions as those of another present wheel for vehicle, that is, the above-described second present wheel, except that the outside member and inside diameter are fastened to the wheel body differently. Specifically, at least one of the opposite ends of the decorated member is fastened to the wheel body in such a state that the outside member and the inside member hold an extension, which extends integrally from the wheel body, between them. In other words, the disk of the wheel body is further provided with an extension, which extends integrally from the wheel body; and the decorated member further has an end, which is fastened to the wheel body so that the outside member and the inside member hold the extension of the disk between them.

The extension of the wheel body refers to the above-described tongues or thinned-out portions. When only an end of the decorated member is fastened to the wheel body with the extension being held between the outside member and the inside member, it is allowable to put the other fastened parts, such as another end of the decorated member, in such a mode that one of the outside member and inside member is fastened to the wheel body and the other one of the outside member and inside member is fastened to the one of the outside member and inside member. Alternatively, it is allowable to put another end of the decorated member in such a mode that the outside member and the inside member hold the extension at plurality of locations in the decorated member. By thus putting the extension of the wheel body under such a condition that it is held between the outside member and the inside member, it is possible to fasten the decorated member to the wheel body more firmly.

Note that the visible space, which is formed between the outside member and the inside member, can be a space in which nothing is present, or can be a space in which a part of the wheel body's disk or another part of the decorated member exists. Although the latter case makes decorations, which cannot be materialized when manufacturing the wheel body by casting or machining, the present wheel can demonstrate distinct and specific decorativeness, which has not been available, as if casting or machining has materialized the decorativeness.

EXAMPLES

Hereinafter, the present wheel for vehicle will be described in detail with reference to specific examples.

Example No. 1

Figure 4:
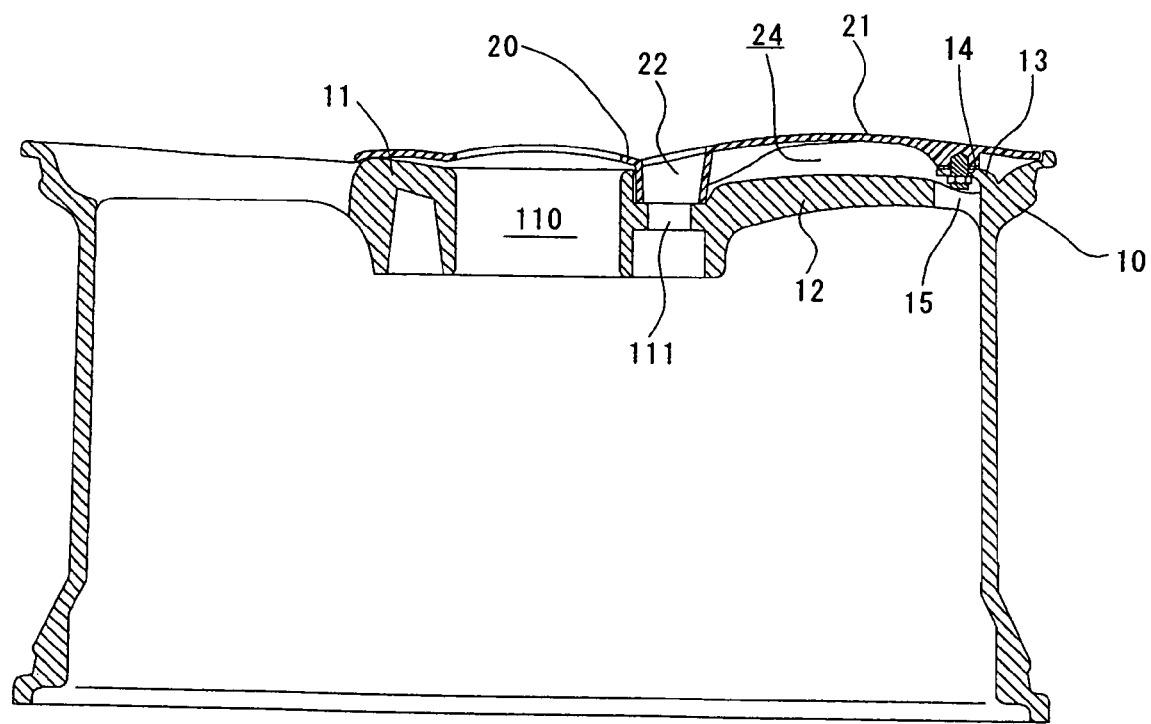
FIG. 4 is a cross-sectional diagram for illustrating the present wheel according to Example No. 1.
Figure 5:
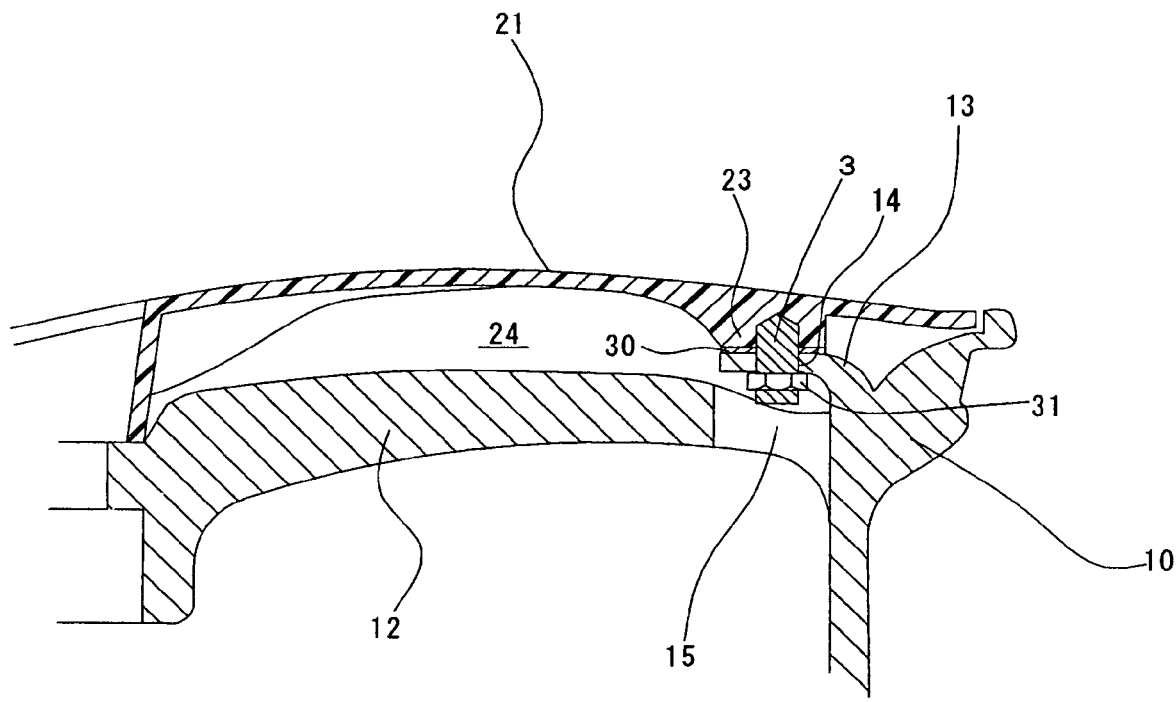
FIG. 5 is an enlarged cross-sectional diagram for illustrating a major section of the present wheel according to Example No. 1.
Figure 6:
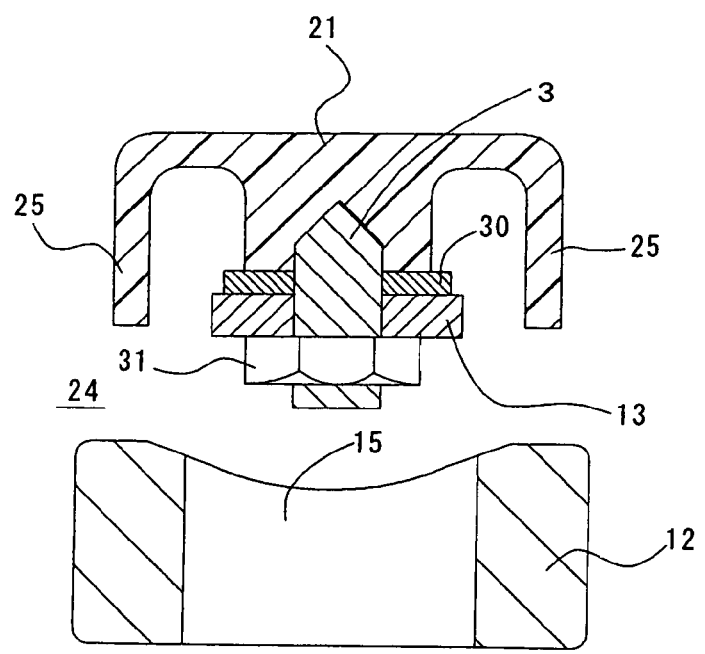
FIG. 6 is another enlarged cross-sectional diagram for illustrating another major section of the present wheel according to Example No. 1.

FIG. 1 illustrates a plan view of a wheel for vehicle according to Example No. 1 of the present invention. FIGS. 4 through 6 illustrate cross-sectional views of the present wheel according to Example No. 1. The present wheel according to Example No. 1 comprises a wheel body 1, and a decorated member 2. The wheel body 1 is made of aluminum alloy, and exhibits metallic gloss. The decorated member 2 is made from polycarbonate-ABS alloy resin by injection molding.

Figure 2:
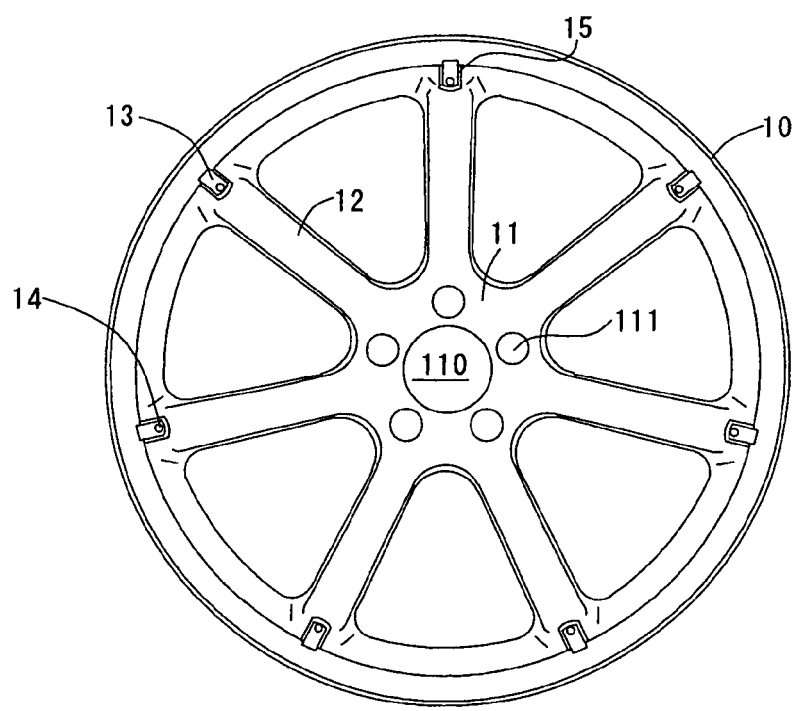
FIG. 2 is a plan-view diagram for illustrating a wheel body, which is used for making the present wheel according to Example No. 1.

FIG. 2 illustrates the wheel body 1. As shown in the drawing, the wheel body 1 comprises a substantially cylindrical rim 10, a hub 11, and a plurality of spokes 12. Onto the rim 10, the bead of tire is seated. To the hub 11, an axle is installed. The spokes 12 extend radially from the hub 11, and connect the hub 10 with the rim 10. The hub 11 is provided with a hub hole 110 at the central portion. Moreover, a plurality of bolt holes 111 is formed around the hub hole 110. Hub bolts penetrate the bolt holes 11 respectively in order to fasten the present wheel according to Example No. 1 to the axle's hub.

The rim 10 is provided with a plurality of tongues 13. The tongues 13 are disposed at positions, which correspond to the respective spokes 12. Each of the tongues 13 extends parallel to each of the spokes 12 and diametrically inward. Moreover, the leading ends of the tongues 13 are provided with an engage hole 14, which penetrates the tongues 13 in the thickness-wise direction (or in the direction of the axle), respectively. In addition, the spokes 12, which face the tongues 13, are provided with a through hole 15, respectively, as expressly shown in FIG. 4 or 5. The through holes 15 penetrate the spokes 12 from the front to the rear.

Figure 3:
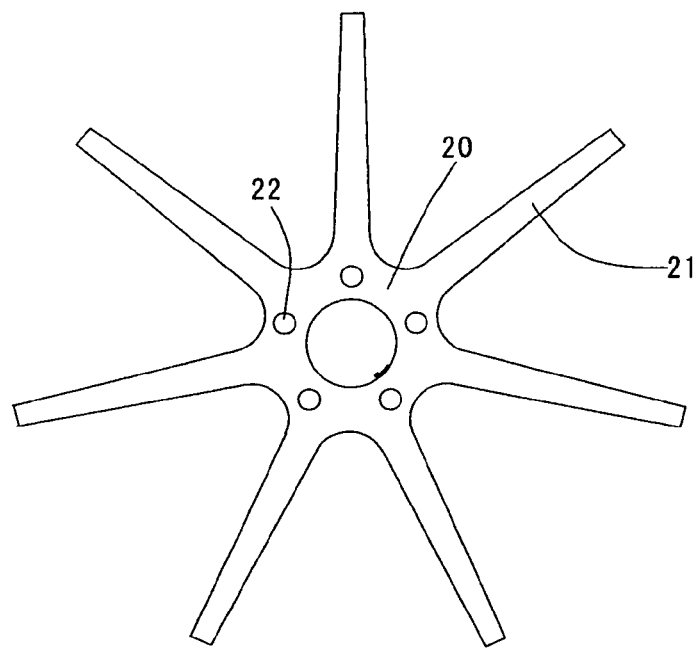
FIG. 3 is a plan-view diagram for illustrating a decorated member, which is used for making the present wheel according to Example No. 1.

As illustrated in FIG. 3, the decorated member 2 is a star-shaped integrally molded product, and exhibits a metallic glossy decoration, which results from electroless plating and chromium electrolytic plating. The decorated member 2 comprises a disk 20, and a plurality of spoke covers 21. The disk 20 covers the hub 11 and hub hole 110 of the wheel body 1. The spoke covers 21 are disposed to extend radially from the disk 20 so as to cover the spokes 12 of the wheel body 1. Moreover, the disk 20 is provided with a plurality of through holes 22, which communicate respectively with the bolt holes 111 of hub 11 of the wheel body 1.

As illustrated in FIG. 5, an enlarged cross-sectional diagram for illustrating a major section of the present wheel according to Example No. 1, the spoke covers 21 of the decorated member 2 are provided with a boss 23, respectively. The boss 23 is disposed on the rear surface of the spoke cover 21 near the outer peripheral end thereof. The leading end of a bolt 3, which serves as a self-tapping screw, is screwed into the boss 23, and is fastened thereto. The bolt 3, which is fastened to the boss 23, is inserted into a washer 30 and the tongue 13 engages with hole 14, and is then tightened to the tongue 13 with a nut 31. Moreover, the spoke cover 21 has an outer peripheral end, which extends outward beyond the boss 23, thereby making a continuous or unified decoration cooperatively with a decorative surface rim 10 of the wheel body 1. In addition, the spoke cover 21 and the spoke 12 make a visible space 24 between them. The visible space 24 exhibits a height or depth in an axial direction of the wheel body 1, and is visible from an axial outer side of the wheel body 1.

Moreover, as illustrated in FIG. 6, another enlarged cross-sectional diagram for illustrating a major section of the present wheel according to Example No. 1, the leading end of the spoke cover 21 is provided with walls 25, 25. The walls 25, 25 extend from the spoke cover 21 perpendicularly downward on the both sides of the tongue 13. The walls 25, 25 are formed downward to a position at which the tongue 13 is located, thereby covering the boss 23 and tongue 13. In addition, as can be understood from FIG. 5, the presence of the through hole 15 of the spoke 12 makes it possible to tighten the nut 31 onto the tongue 13 and the spoke cover 21's boss 23 on the rear-surface side of spoke 12.

Specifically, the present wheel according to Example No. 1 comprises the decorated member 2. The decorated member 2 includes the spoke covers 21, and the disk 20. The spoke covers 21 are equipped with a metallic glossy decoration, and extend radially along a surface of the wheel body 1 spokes 12 as shown in FIG. 1. The disk 20 covers the wheel body 1 hub 11 as shown in the drawing. The thus made decorated member 2 is fastened on the surface of wheel body 1. Moreover, the present wheel according Example No. 1 comprises the visible spaces 24. The visible spaces 24 can be recognized visually from the outside of vehicle. In addition, the visible spaces 24 can be viewed as if they are formed in the metallic spokes 12. All in all, the present wheel according to Example No. 1 demonstrates unprecedented and remarkably distinctive decorativeness that has not been available.

Moreover, the decorated member 2 is provided with such an enhanced decoration that the installed parts are less likely to be visible, because the walls 25, 25 cover the bosses 23 entirely and the tongues 13 of rim 10 of the wheel body 1 partially as shown in FIG. 6.

In addition, since the decorated member 2 is made from resin, it can achieve the weight-saving requirement more, and can contribute to improving mileage (or fuel economy) more than the case where the identical decoration is formed of aluminum alloy completely.

Moreover, since the decorated member 2 is tightened onto the wheel body 1 at a plurality of locations in the outer periphery, it can satisfactorily withstand the loads during the driving of vehicle, and can be replaced with ease. In addition, since the visible spaces 24 are disposed between the spoke covers 21 and spokes 2 of wheel body 1 of decorated member 2, it is not needed to thin out the spokes 12 for the purpose of disposing the decorated member 2 on the wheel body 1. Therefore, although the present wheel according Example No. 1 keeps exhibiting sufficient strength as wheel per se, it can demonstrate enhanced freedom in designing decorations. Moreover, since the decorated member 2 can give wheel designers upgraded freedom of designing wheels colorfully, it works cooperatively with the wheel body 1, which is made of aluminum alloy, to make it possible to provide the present wheel according to Example No. 1 with a noble decoration that has not been obtainable by simply casting or forging the entire wheel.

Figure 7:
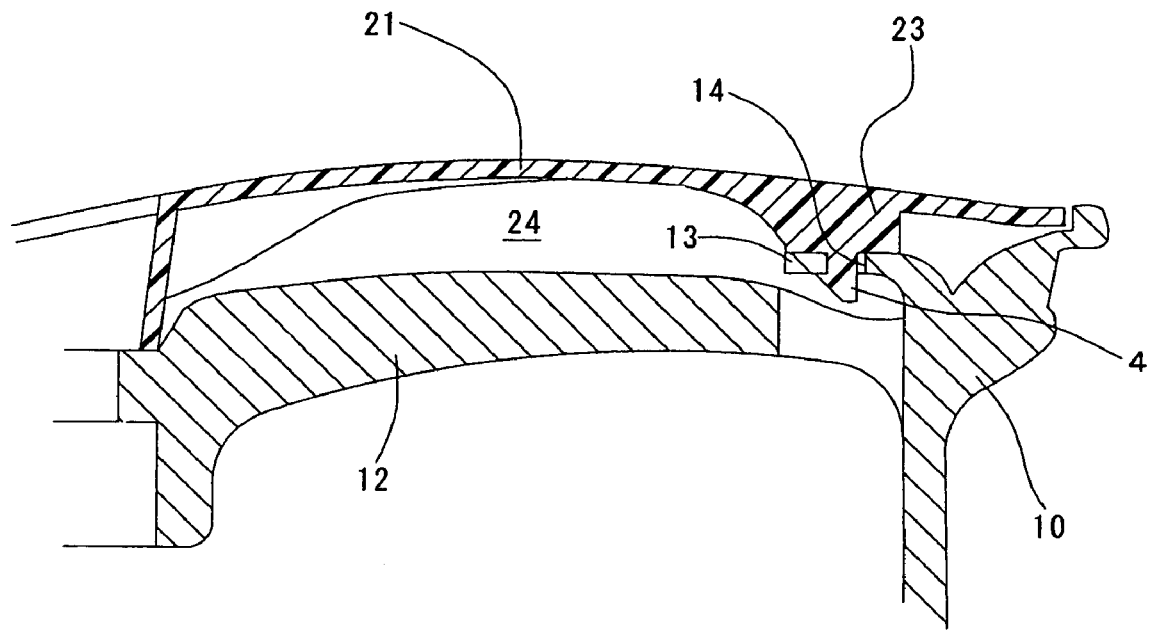
FIG. 7 is an enlarged cross-sectional diagram for illustrating a major section of a modified version of the present wheel according to Example No. 1.
Figure 8:
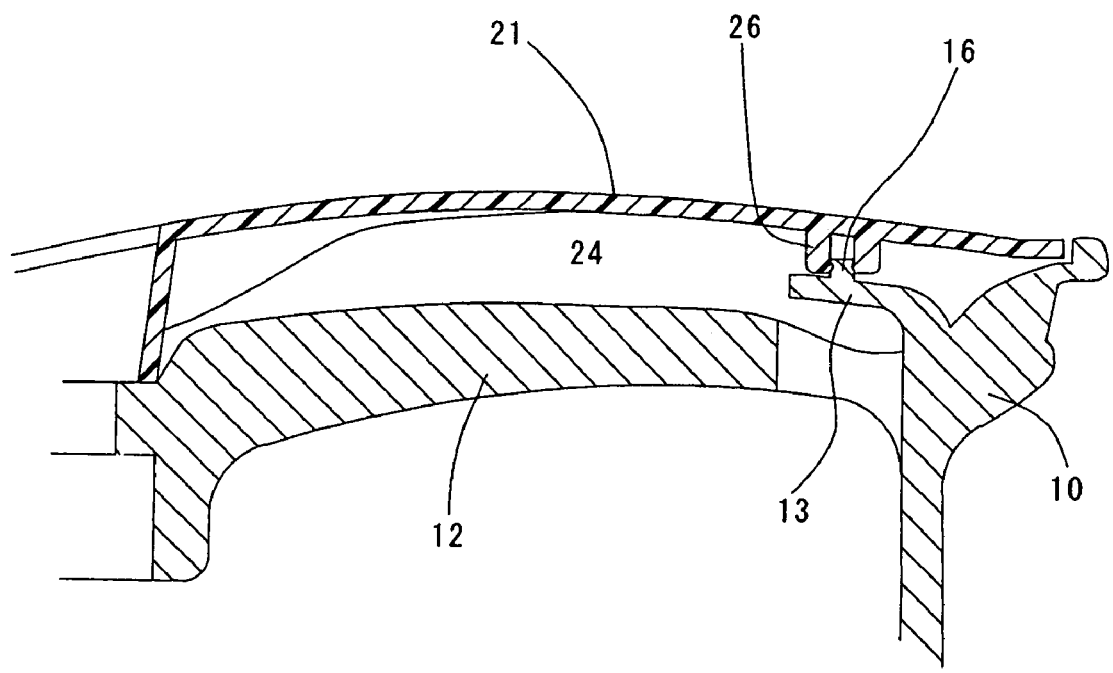
FIG. 8 is an enlarged cross-sectional diagram for illustrating a major section of another modified version of the present wheel according to Example No. 1.

Note that, in the present wheel according to Example No. 1, the bolts 3 and nuts 31 tighten the decorated member 2 spoke covers 20 to the tongues 13 of rim 10 of the wheel body 1 as illustrated in FIG. 5. However, instead of the bolts 13 and nuts 31, it is possible to fasten the decorated member 2 to the wheel body 1 by engaging claw 4 with hole 14 of tongue 13 as shown in FIG. 7. Moreover, as illustrated in FIG. 8, it is possible to fasten the decorated member 2 to the wheel body 1 by fitting protrusion 16 to engage with cylinder 26, which protrudes from the tongue 13, and is disposed on the rear surface of the spoke cover 21 as shown in the drawing.

Example No. 2

Figure 9:
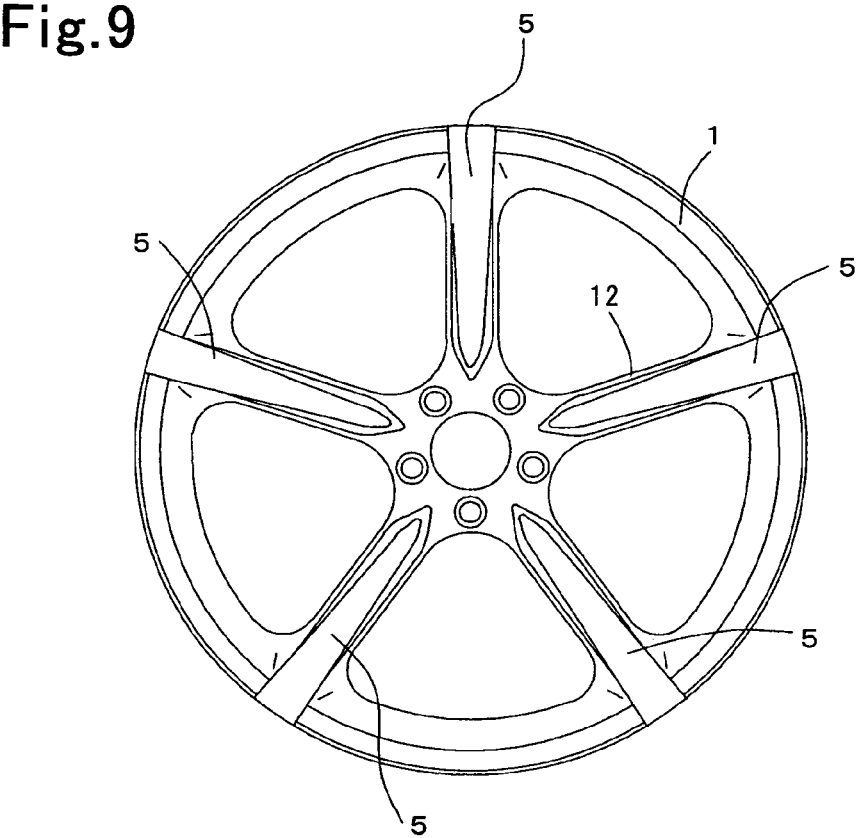
FIG. 9 is a plan-view diagram for illustrating a wheel for vehicle according to Example No. 2 of the present invention.
Figure 10:
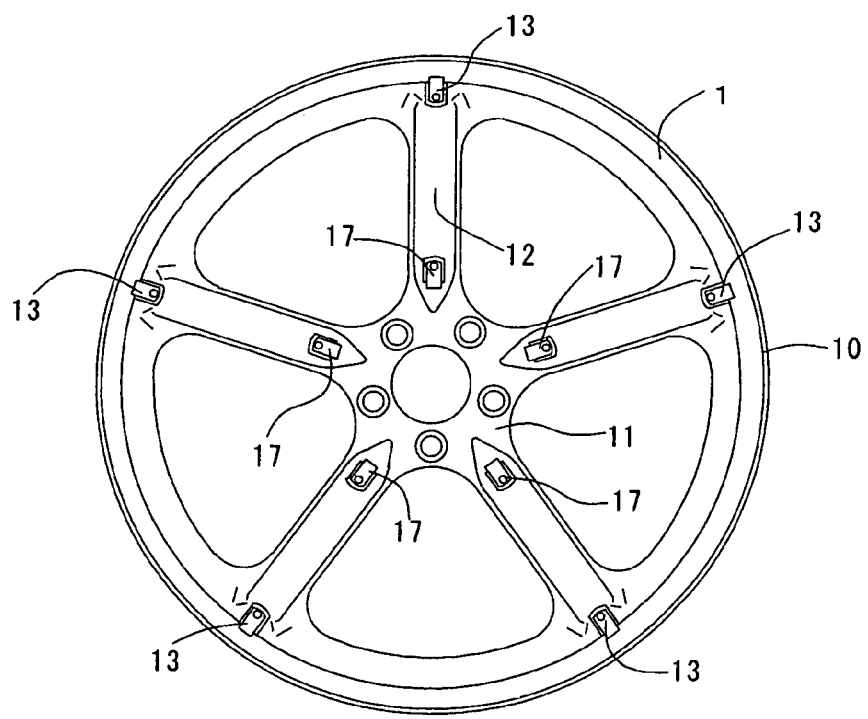
FIG. 10 is a plan-view diagram for illustrating a wheel body, which is used for making the present wheel according to Example No. 2.

FIG. 9 illustrates a plan view of a wheel for vehicle according to Example No. 2 of the present invention. FIG. 10 illustrates a plan view of a wheel body, which makes the present wheel according to Example No. 2. Although the present wheel according to Example No. 1 comprises the decorated member 2, which includes the disk 20 and the spoke covers 21, the present wheel according Example No. 2 comprises a plurality of strip-shaped decorated members 5, which are fastened to the spokes 12 of the wheel body 1 respectively. Except the above-described feature, the present wheel according to Example No. 2 comprises the same constituent elements as those of Example No. 1.

Specifically, spokes 12 of the wheel body 1 are provided with a tongue 13, respectively, which is made in the same manner as tongues 13 of the wheel body 1 in Example No. 1. That is, the spokes 12 have the tongue 13, which extends parallel to the spokes 12 and diametrically inward, respectively. Likewise, engaged hole is bored through each leading end of the tongues 13 in the thickness-wise direction (or in the direction of axle), respectively.

Moreover, the wheel body 1 spokes 12 are further provided with a second tongue 17, respectively, as illustrated in FIG. 10. As shown in the drawing, the second tongues 17 extend parallel to the spokes 12 and diametrically outward. Moreover, the leading ends of the second tongues 17 are provided with engaged hole, which penetrates the second tongues 17 in the thickness-wise direction (or in the direction of axle), respectively.

The respective decorated members 5 are made of polycarbonate-ABS alloy resin by injection molding. Each rear surface of the decorated members 5 is provided with a not-shown boss, respectively, at the opposite ends of the decorated members 5. The bosses are formed in the same manner as the bosses 23 in Example No. 1. Likewise, a not-shown metallic bolt is fastened to the not-shown bosses, respectively. The not-shown bolt's leading end serves as a self-tapping screw, and is screwed into the not-shown bosses, respectively. Similarly, a not-shown nut is tightened to the not-shown bolts, which are fastened to the not-shown bosses, respectively, after inserting the bolts into a not-shown washer and the tongues 13 and 17 are provided with a hole.

Thus, the present wheel according Example No. 2 comprises visible spaces, which are made in the same manner as the visible spaces 24 in Example No. 1. Therefore, a viewer can see the visible spaces, which are disposed between the decorated members 5 and the wheel body 1 spokes 12 and which exhibit a height or depth in an axial direction of the wheel body 1, on an axially outer side of the wheel body 1.

Example No. 3

Figure 11:
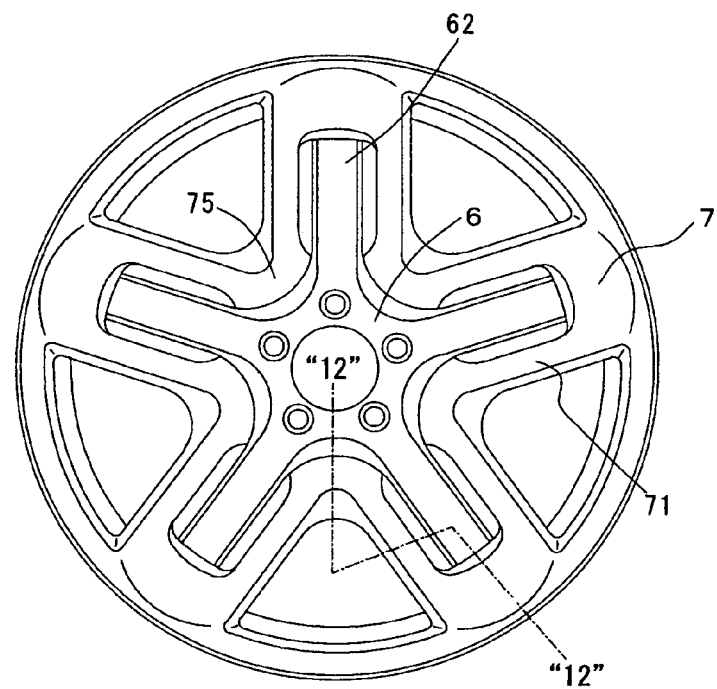
FIG. 11 is a plan-view diagram for illustrating a wheel for vehicle according to Example No. 3 of the present invention.
Figure 12:
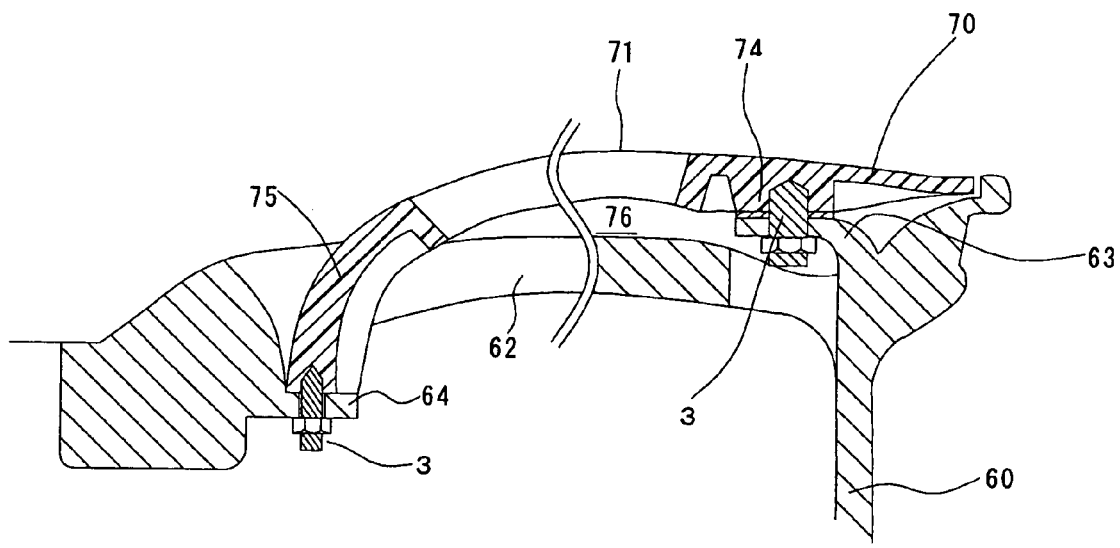
FIG. 12 is a cross-sectional diagram for illustrating the present wheel according to Example No. 3, cross-sectional diagram which is taken along line "12"-"12" designated in FIG. 11.

FIG. 11 illustrates a plan view of a wheel for vehicle according to Example No. 3 of the present invention. FIG. 12 illustrates a cross-sectional view of the present wheel according to Example No. 3. A wheel body 6, and a decorated member 7 make the present wheel according to Example No. 3. The wheel body 6 is made of aluminum alloy, and exhibits metallic gloss. The decorated member 7 is made from polycarbonate-ABS alloy resin by injection molding.

Figure 13:
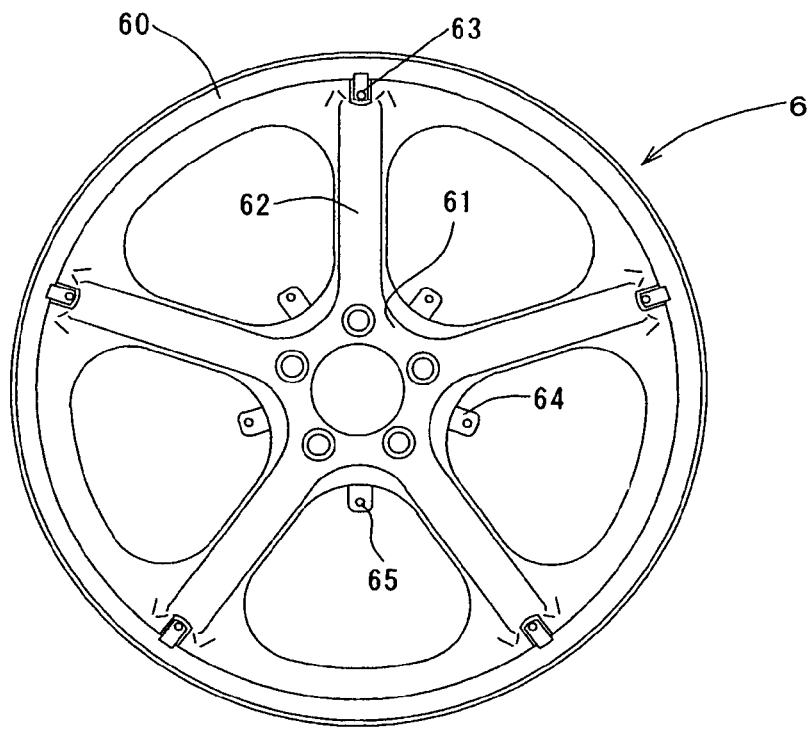
FIG. 13 is a plan-view diagram for illustrating a wheel body, which is used for making the present wheel according to Example No. 3.

FIG. 13 illustrates the wheel body 6. As shown in the drawing, the wheel body 6 comprises a substantially cylindrical rim 60, a hub 61, and a plurality of spokes 62. Onto the rim 60, the bead of tire is seated. To the hub 61, an axle is installed. The spokes 62 extend radially from the hub 61, and connect the hub 61 with the rim 60. Moreover, the rim 60 is provided with tongues 63, which are formed in the same manner as the tongues 13 in Example No. 1. Accordingly, the tongues 63 likewise extend parallel to the spokes 62 and diametrically inward.

Moreover, the wheel body 6 further comprises a plurality of second tongues 64, which are disposed respectively between the spokes 62 of the wheel body 6. As illustrated in FIG. 12, the second tongues 64 protrude diametrically outward from the hub 61 of the wheel body 6, respectively. The second tongues 64 are provided with engaged hole 65, respectively. The engaged holes 65 penetrate the second tongues 64 in the thickness-wise direction (or the direction of axle), respectively. The tongues 63 are disposed on the outer axial side of wheel body 6. The second tongues 64 are disposed on the inner axial side of wheel body 6.

Figure 14:
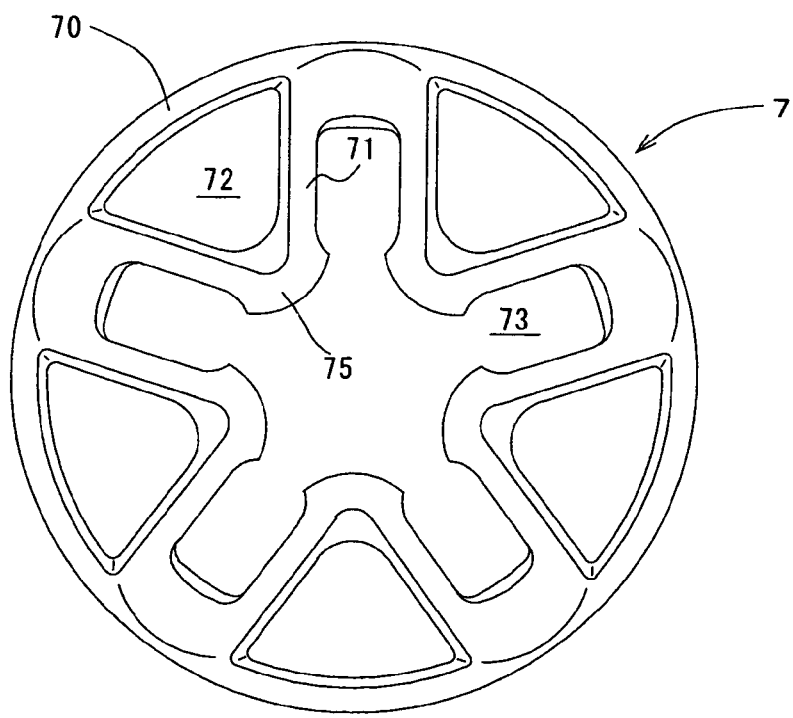
FIG. 14 is a plan-view diagram for illustrating a decorated member, which is used for making the present wheel according to Example No. 3.

As illustrated in FIG. 14, the decorated member 7 is an integrally molded product, and has been subjected to electroless plating and chromium electrolytic plating in advance to produce a metallic glossy decoration. The decorated member 7 includes an outer periphery 70, and a plurality of arms 71. The outer periphery 70 covers the rim 60 of the wheel body 6. The arms 71 extend from the outer periphery 70 diametrically inward, and curve from an outer side to and inner side smoothly in an axial direction of the decorated member 7. Moreover, the arms 71 are connected to each other at the neighboring leading ends, thereby providing the decorated member 7 with a decorative opening 72 between the neighboring arms 71. In addition, the arms 71 are provided with a cut-off 73, respectively. The cut-offs 73 extends from the inner peripheral end of the decorated member 7 toward the outer peripheral end thereof.

Moreover, as illustrated in FIG. 12, the decorated member 7 further comprises bosses 74. The bosses 74 are disposed on the rear surface of the decorated member 7, and are disposed at a plurality of locations at around the outer peripheral ends of the arms 7 respectively. The bosses 74 are formed in the same manner as the bosses 23 in Example No. 1. In addition, the bolts 3 are likewise fastened to the bosses 74. Moreover, as illustrated in FIG. 14, the neighboring arms 71 are connected to each other at the trailing ends to make connectors 75, and the bolts 3 are also fastened to the trailing ends of the connectors 75 as shown in FIG. 12.

As described above, the bosses 74, which are disposed at around the outer peripheral ends of the decorated member 7 arms 71, are fastened to the tongues 63 of the wheel body 6; and the connectors 75 are fastened to the second tongues 64 of the wheel body 6; and thereby the decorated member 7 is fastened to the wheel body 6. As illustrated in FIG. 12, the outer periphery 70 of the decorated member 7 covers a surface of rim 60 of wheel body 6. The outer peripheral ends of the arms of decorated member 7 cover outer-peripheral end surfaces of spokes 62 of wheel body 6. As shown in FIG. 12, the arms 71 extend from the front-surface side of wheel body 6 toward its rear-surface side while curving smoothly. Thus, the arms 71 and the spokes 62 make visible spaces 76 between them.

Therefore, the present wheel according to Example No. 3 produces such an unprecedented and distinctive decoration that the spokes 62 of the wheel body 6 appear in the cut-offs 73 of the decorated member 7; and the arms 71 of the decorated member 7 come from under a front side of the wheel body 6, go around a rear side of the wheel body 6, and then go down under the rear side of the wheel body 6 along the spokes 62 of the wheel body 6.

Example No. 4

Figure 15:
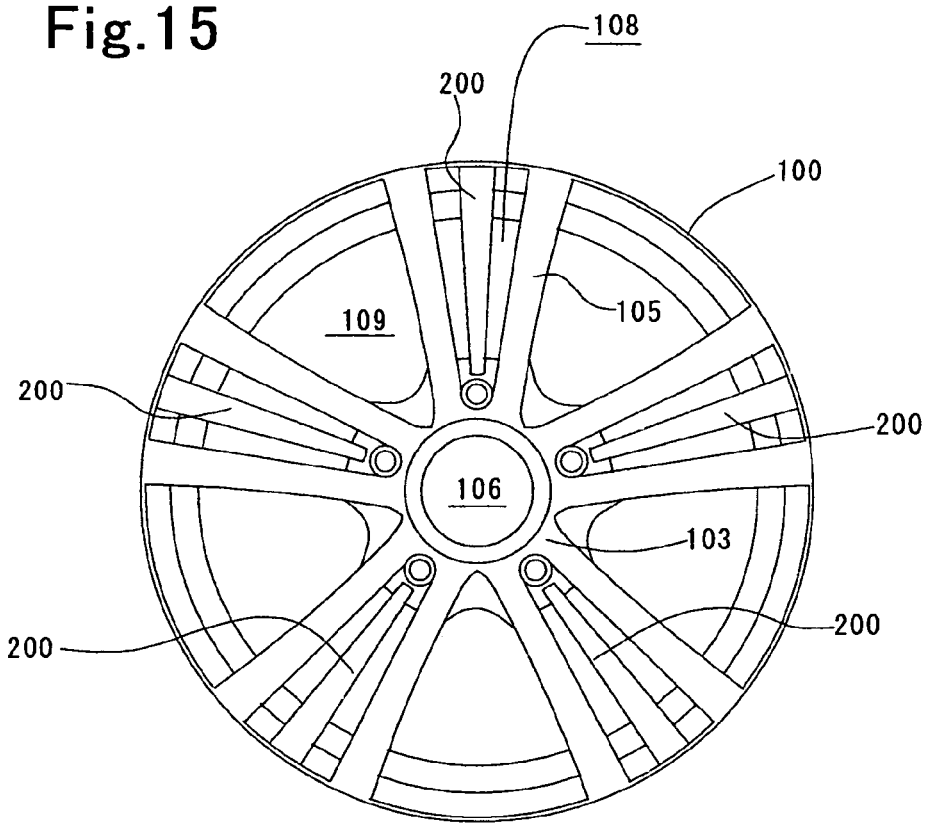
FIG. 15 is a plan-view diagram for illustrating a wheel for vehicle according to Example No. 4 of the present invention.
Figure 17:
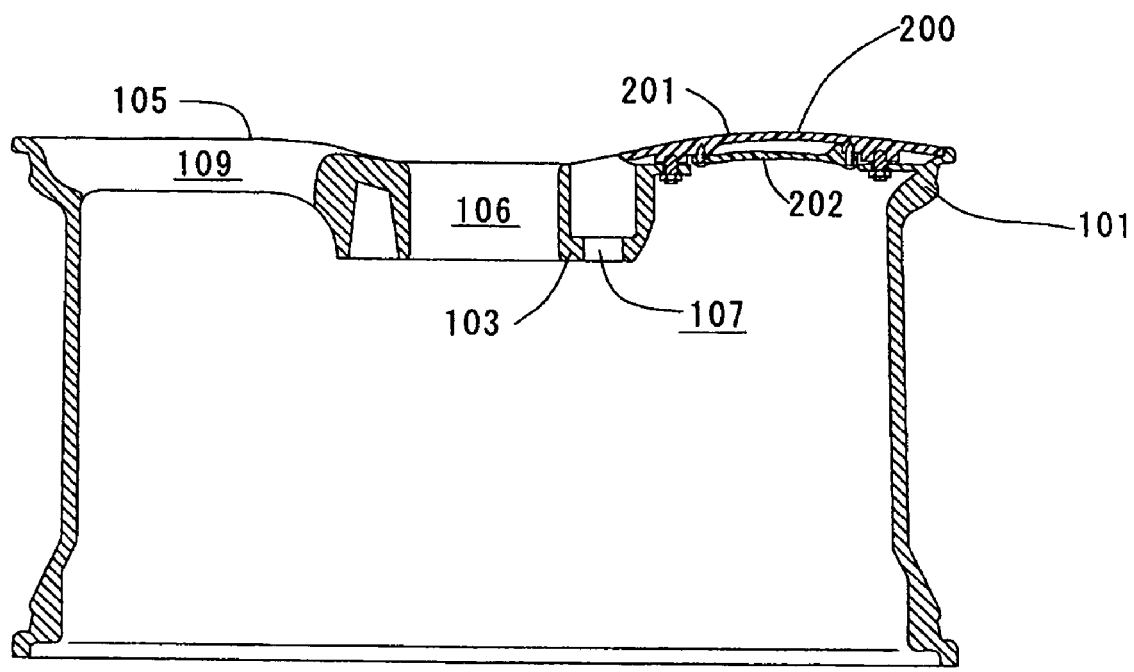
FIG. 17 is a cross-sectional diagram for illustrating the present wheel according to Example No. 4.

FIG. 15 illustrates a plan view of a wheel for vehicle according to Example No. 4 of the present invention. FIG. 17 illustrates a cross-sectional view of the present wheel according to Example No. 4. The present wheel according to Example No. 4 comprises a wheel body 100, and a plurality of decorated members 200. The wheel body 100 is made of aluminum alloy, and exhibits metallic gloss. The decorated members 200 are made from polycarbonate-ABS alloy resin by injection molding.

Figure 16:
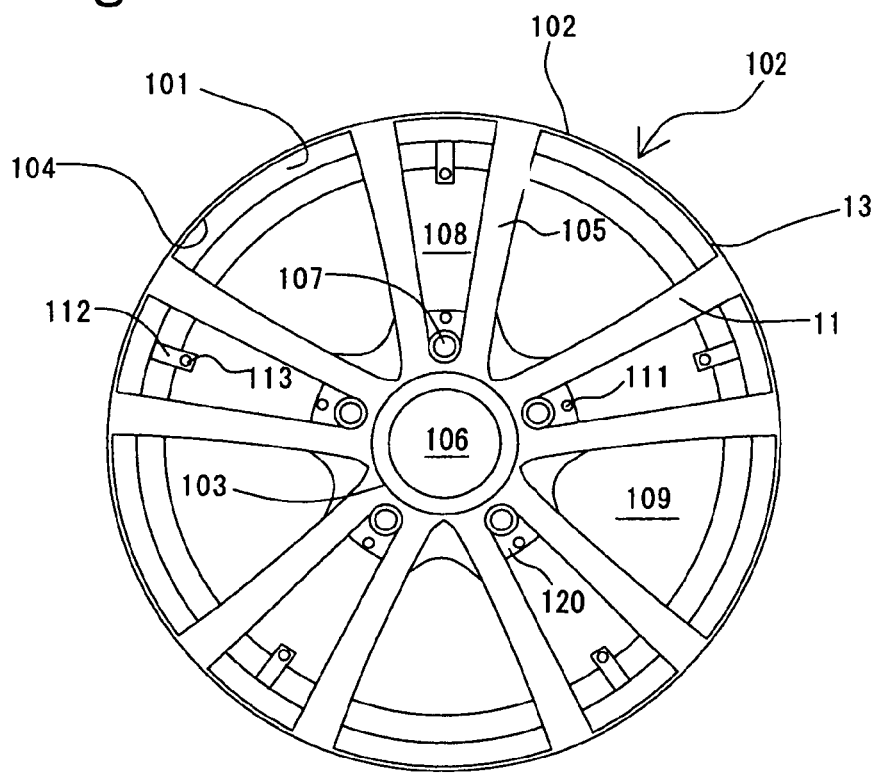
FIG. 16 is a plan-view diagram for illustrating a wheel body, which is used for making the present wheel according to Example No. 4.

FIG. 16 illustrates the wheel body 100. As shown in the drawing, the wheel body 100 comprises a substantially cylindrical rim 101, and a disk 102. Onto the rim 101, the bead of tire is seated. The disk 102 makes a decorative surface. The disk 102 includes a hub 103, an outer periphery 104, and a plurality of spokes 105. Onto the hub 103, an axle is installed. The outer periphery 104 makes a part of the rim 101. The spokes 105 connect the hub 103 with the outer periphery 104. The hub 103 is provided with a hub hole 106 at the central portion. Moreover, a plurality of bolt holes 107 is formed around the hub hole 106. Hub bolts penetrate the bolt holes 107 respectively in order to fasten the present wheel according to Example No. 4 to the axle's hub. Note that, although the present wheel according to Example No. 4 comprises the wheel body 100 in which the rim 101 and disk 102 are made integrally, it is possible to use a wheel body which is made by combining the rim 101 and disk 102 that are made separately.

Each two of the spokes 105 are paired to make a set, and five sets of the paired two spokes 105 are provided in the wheel body 100. The respective sets of the paired two spokes 105 extend radially from the hub 103, thereby making a star-shaped decoration. The two spokes 105, which make the paired set, form first decorative openings 108 between them, respectively. Moreover, the respective two sets of the paired two spokes 105 form second decorative openings 109, respectively, between them and clockwise or counterclockwise next to the first decorative openings 108 by way of one of the paired two spokes 105.

Moreover, the hub 103 is provided with thinned-out portions 120. The thinned-out portions 120 are disposed diametrically outward to the bolt holes 107. The thinned-out portions 120 extend into the first decorative openings 108, respectively. The thinned-out portions 120 are provided with an inner-periphery engaged hole 111, which penetrates the thinned-out portions 120 in the thickness-wise direction (or in the direction of axle), respectively. In addition, the rim 101 is provided with tongues 112, which extend diametrically inward toward the respective first decorative openings 108. The tongues 112 are provided with an outer-periphery engaged hole 113 at around the leading ends. The outer-periphery engaged holes 113 penetrate the tongues 112 in the thickness-wise direction (or in the direction of the axle), respectively.

Figure 18:
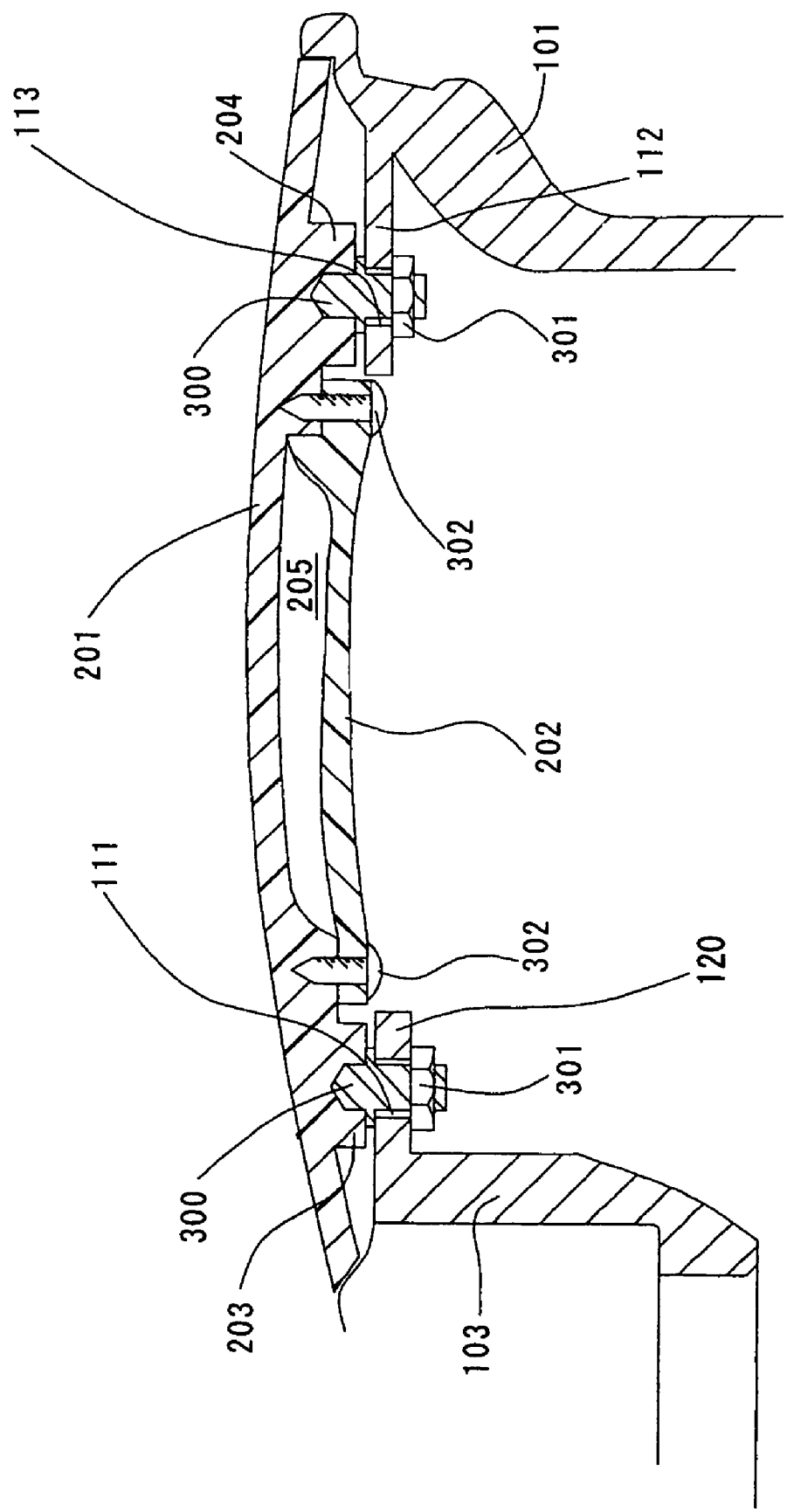
FIG. 18 is an enlarged cross-sectional diagram for illustrating a major section of the present wheel according to Example No. 4.

As illustrated in FIG. 15, the decorated members 200 are disposed in the first decorative openings 108, respectively, so that they extend in a diametric direction. As illustrated in FIGS. 17 and 18, the respective decorated members 200 comprises an outside member 201, and an inside member 202. The outside member 201 is disposed on an outer side axially with respect to the wheel body 100. The inside member 202 is disposed on an inner side axially with respect to the wheel body 100. Electroless plating and chromium electrolytic plating have been performed in advance onto the outside member 201's surface and onto the surface of the inside member 202 to give them a metallic glossy decoration.

As illustrated in FIG. 18 for showing a cross-sectional view of the present wheel according to Example No. 4 enlargedly, a boss 203 and a boss 204 are formed at around the opposite ends on a rear surface of the respective outside member 201 decorated members 200. Metallic bolts 300 (i.e., claimed fastening portion) are fastened to the boss 203 and boss 204, respectively, by screwing the leading ends into the boss 203 and boss 204. The bolts 300 serve as a self-tapping screw, respectively. The bolt 300, which is fastened to the boss 203, is inserted into the inner-periphery engaged hole 111 (i.e., claimed fastened portion) of the thinned-out portion 120, and is then tightened to the thinned-out portion 120 with a nut 301. On the other hand, the bolt 300, which is fastened to the boss 204, is inserted into the outer-periphery engaged hole 113 (i.e., claimed fastened portion) of the tongue 112, and is then tightened to the tongue 112 with a nut 301. Moreover, the outside member 201 has an inner peripheral end, which extends diametrically inward beyond the boss 203, thereby making a continuous or unified decoration cooperatively with a decorative surface of hub 103 of the wheel body 100. In addition, the outside member 201 has an outer peripheral end, which extends diametrically outward beyond the boss 204, thereby making a continuous or unified decoration cooperatively with a decorative surface of rim 101 of the wheel body 100.

As illustrated in FIG. 18, the inside member 202 is disposed on a rear surface of the outside member 201. The inside member 202 is fastened to the outside member 201 integrally by tightening the opposite ends with screws 302, respectively.

That is, one of the screws 302 is screwed into the outer-peripheral end of inside member 202 that is close to boss 204 of the outside member 201, and the other one of the screws 302 is screwed into the inner-peripheral end of inside member 202 that is close to the boss 203 of outside member 201. Thus, the present wheel according to Example No. 4 comprises visible spaces 205 between the outside members 201 and inside members 202. The visible spaces 205 exhibit a height in an axial direction of the wheel body 100, and are visible from an axial outer side of the wheel body 100.

Specifically, as illustrated in FIG. 15, the present wheel according to Example No. 4 comprises the decorated members 2. The decorated members 2 exhibit the same metallic glossy decoration as that of spokes 105 of the wheel body 100, and are disposed so as to extend radially within the first decorative openings 108 of wheel body 100. Therefore, a set of the two paired spokes 105 and one of the decorated members 200 make a set of three-spoked configuration, thereby providing the present wheel according to Example No. 4 with a star-shaped decoration in which the second decorative openings 109 are disposed between the neighboring sets of three-spoked configuration. Moreover, since the visible spaces 205, which can be recognized visually from the outside of vehicle, are recognized visually as if they are formed in the metallic spokes 105, the visible spaces 205 enable the present wheel according to Example No. 4 to demonstrate unprecedented and remarkably distinctive decorativeness that has not been available.

Moreover, the outside member 201 of the respective decorated members 200 covers the inner-peripheral engaged hole 111 of the respective thinned-out portions 120 and the outer-peripheral engaged hole 113 of the respective tongues 112. Accordingly, when a viewer sees the present wheel according to Example No. 4 on the front side, he or she hardly recognizes the installed parts of the respective decorated members 200. Consequently, the outside members 201 give the present wheel according to Example No. 4 enhanced decorativeness.

In addition, note that the decorated members 200 are made from resin. Therefore, compared with the case of forming the identical decoration of aluminum alloy completely, the decorated members 200 enable the present wheel according to Example No. 4 to achieve the weight-saving requirement more and to contribute to improving mileage (or fuel economy) more.

Moreover, not only it is possible for the decorated members 200 to satisfactorily withstand the loads that vehicles apply to them during driving, but also it is possible for user or mechanic to replace them with ease, because the decorated members 200 are tightened to the wheel body 100 at two locations, the inner-peripheral end and the outer-peripheral end. In addition, no thinned-out spokes 105 are needed in order to dispose the decorated members 200 on the wheel body 100, because the decorated members 200 can be simply disposed in the first decorative openings 108 that are arranged between the paired spokes 105. Therefore, the present wheel according Example No. 4 enables wheel designers to design decorations freely while keeping exhibiting sufficient strength as wheel per se. Moreover, wheel designers can design the decorated members 200 freely regarding their colors as well and make the resulting colorful decorated members 200 work cooperatively with the wheel body 100, which is made of aluminum alloy. As a result, the present wheel according to Example No. 4 can produce noble decorative effects that have not been obtainable by simply casting or forging the entire wheel.

Example No. 5

Figure 19:
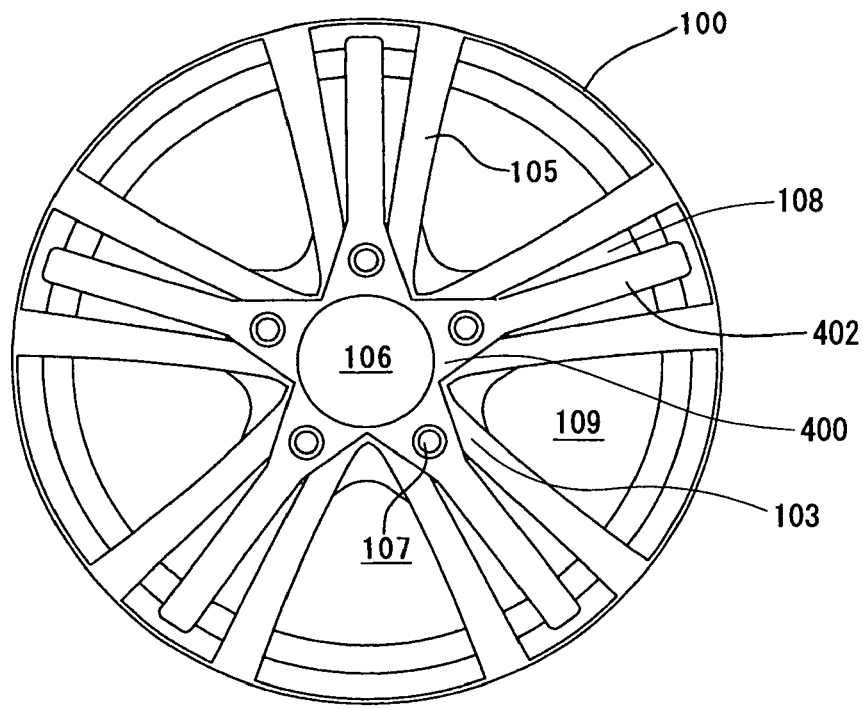
FIG. 19 is a plan-view diagram for illustrating a wheel for vehicle according to Example No. 5 of the present invention.
Figure 20:
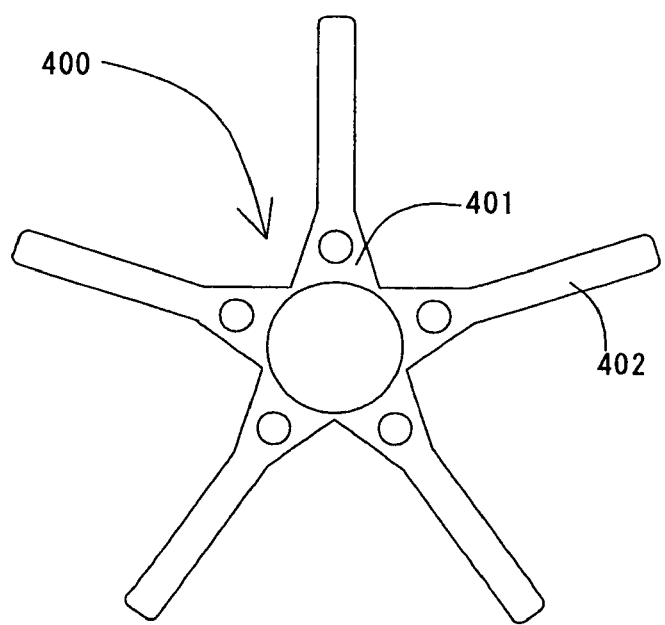
FIG. 20 is a plan-view diagram for illustrating a decorated member, which is used for making the present wheel according to Example No. 5.
Figure 21:
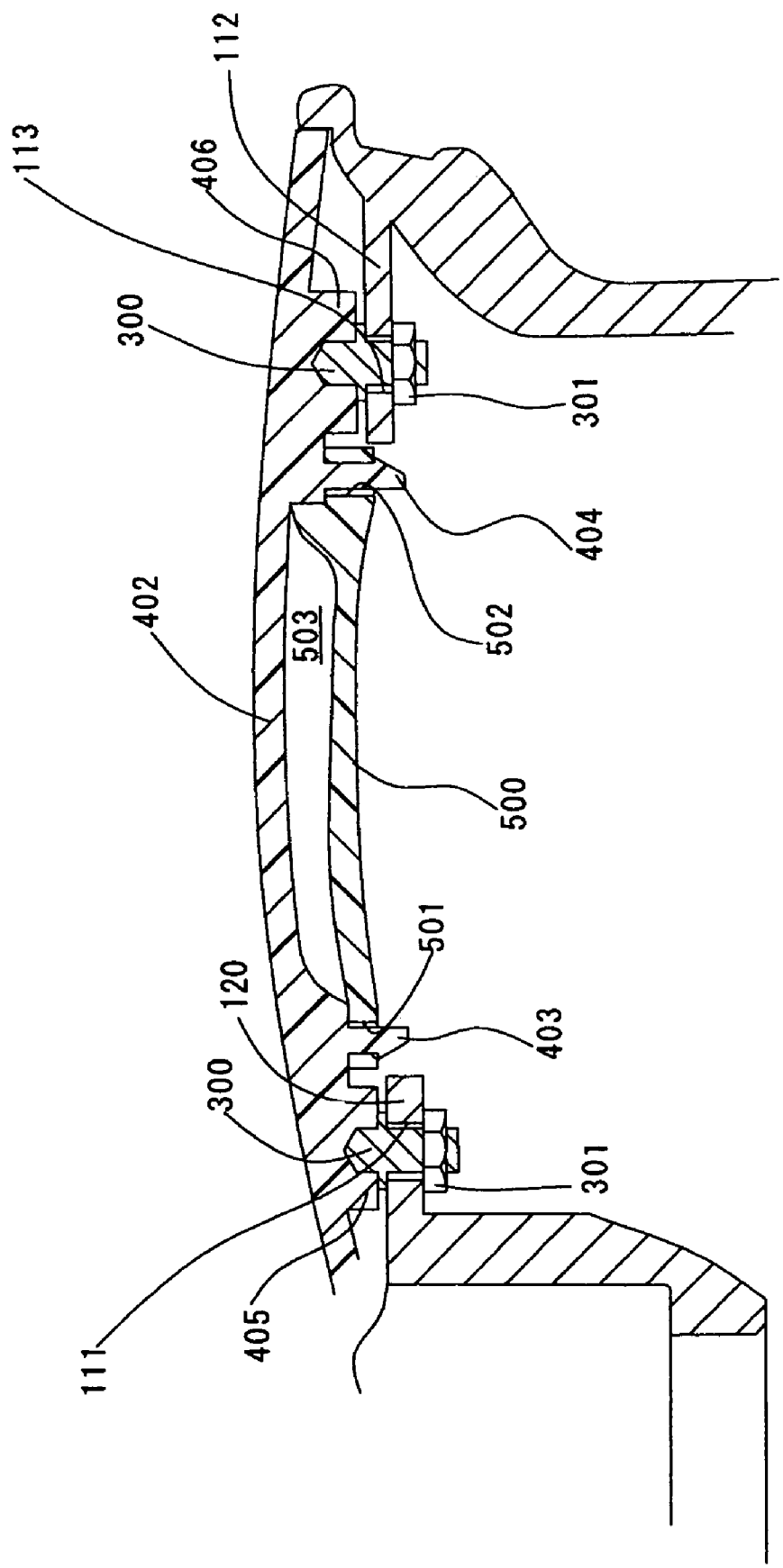
FIG. 21 is an enlarged cross-sectional diagram for illustrating a major section of the present wheel according to Example No. 5.

FIGS. 19 through 21 are directed to a wheel for vehicle according to Example No. 5 of the present invention. The present wheel according to Example No. 5 comprises a wheel body 100, an outside member 400, and an inside member 500. The wheel body 100 is made in the same manner as that in Example No. 4. The outside member 400 is made from polycarbonate-ABS alloy resin by injection molding. The inside member 500 is made from polycarbonate-ABS resin by injection molding. A surface of the outside member 400 and a surface of the inside member 500 have underwent electroless plating and chromium electrolytic plating, thereby exhibiting a metallic glossy decoration, respectively.

As illustrated in FIG. 20, the outside member 400 comprises a center 401, and five arms 402. The center 401 covers the hub 103 of the wheel body 100 excepting the hub hole 106 and the bolt holes 107. The arms 402 extend from the center 401 to protrude radially therefrom. Note that, except that a pair of claws 403, 404 extend downward from the rear surface of the respective arms 402 as shown in FIG. 21, each of the five arms 402 is made in the same manner as the outside members 201 in Example No. 4.

The outside member 400 is fastened to the wheel body 100 in the following manner. As illustrated in FIG. 19, the five arms 402 are disposed in the first decorative openings 108 of the wheel body 100 so as to traverse them radially. Then, as illustrated in FIG. 21, the bolts 300, which are tightened to bosses 405 of the outside member 400, are inserted into the inner-peripheral engaged holes 111, which are formed in the thinned-out portions 120 of hub 103 of the wheel body 100, with nuts 301. Accordingly, center 401 of the outside member 400 is fastened to hub 103 of the wheel body 100. On the other hand, at the leading ends of the respective arms 402 (or at the outer peripheral ends thereof), the bolts 300, which are tightened to bosses 406 of the outside member 400, are inserted into the outer-peripheral engaged holes 113, which are formed in the tongues 112 of rim 101 of the wheel body 100, with nuts 301. Consequently, arms 402 of the outside member 400 are fastened to rim 101 of the wheel body 100.

The inside members 500 are formed as a plate shape, which corresponds to arms 402 of the outside member 400, and are disposed in a quantity of 5. The respective inside members 500 are provided with through holes 501, 502 at around the opposite ends. The through holes 501, 502 engage with the claws 402, 404, respectively, of the outside member 400, thereby fastening the respective inside members 500 to arms 402 of the outside member 400. Moreover, the arms 402 of the outside member 400 and the inside members 500 form visible spaces 503 between them. Similarly to the visible spaces in the above-described examples, not only the visible spaces 503 are provided with a height in an axial direction of the wheel body 100, but also a viewer can recognize them visually on an axial outside of the wheel body 100.

Therefore, it is apparent that not only the present wheel according to Example No. 5 operates and effects advantages in the same as the present wheel according to Example No. 4, but also makes it possible to materialize providing the spokes 105 of the wheel body 100 with another distinctive decorations.

Example No. 6

Figure 22:
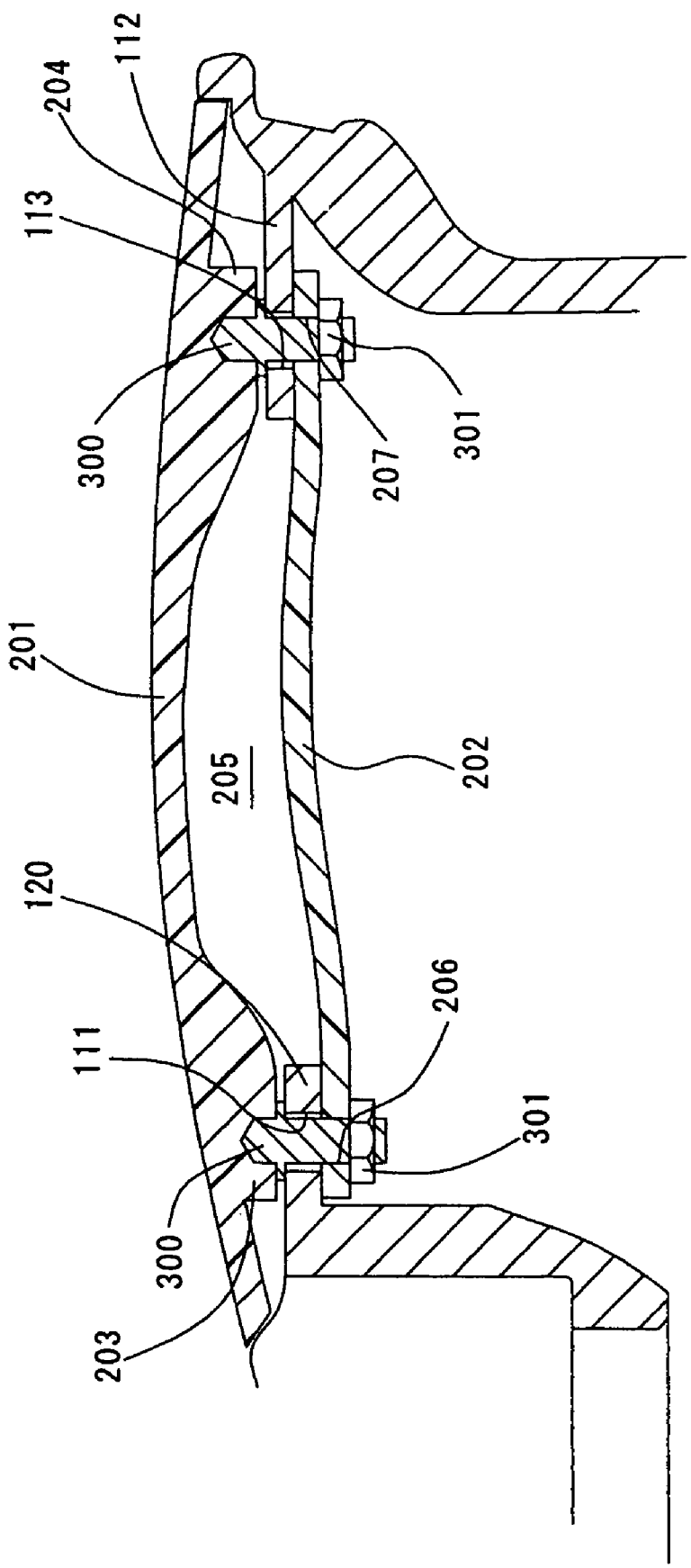
FIG. 22 is an enlarged cross-sectional diagram for illustrating a major section of a wheel for vehicle according to Example No. 6 of the present invention.

FIG. 22 illustrates a wheel for vehicle according to Example No. 6 of the present invention. Since the present wheel according to Example No. 6 comprises the same constituent elements as those in Example No. 4 except that it comprises a construction for fastening the inside member 202 to the outside member 201, construction which is made differently from that in Example No. 4, like constituent elements will be hereinafter described while designating them with the same reference numerals as those in FIGS. 15 through 18 that are directed to Example No. 4.

As illustrated in FIG. 22, the inside member 202 is made longer than that in Example No. 4, and is provided with through holes 206, 207 at around the opposite ends. The through holes 206, 207 retain the bolts 300 therein insertably. Specifically, at around the inner peripheral end of the inside member 202, the bolt 300, which is disposed to extend downward from box 203 of the outside member 201, is inserted into the through hole 206 of the inside member 202 via the inner-peripheral engaged hole 111, which is formed in the thinned-out portion 120 of hub 103 of the wheel body 100. Then, the nut 301 fastens the outside member 201 and inside member 202 integrally to the thinned-out portion 120 of hub 103 of the wheel body 100 so that the outside member 201 and inside member 202 hold the thinned-out portion 120 between them. On the other hand, at around the outer peripheral end of inside member 202, the bolt 300, which is disposed to extend downward from boss 204 of the outside member 201, is inserted into the through hole 207 of the inside member 202 via the outer-peripheral engaged hole 113, which is formed in the tongue 112 of rim 101 of the wheel body 100. Then, the nut 301 fastens the outside member 201 and inside member 202 integrally to the tongue 112 of rim 101 of the wheel body 100 so that the outside member 201 and inside member 202 hold the tongue 112 between them.

The present wheel according to Example No. 6 also comprises visible spaces 205, which are disposed between the outside members 201 and the inside members 202. Likewise, not only a height is given to the visible spaces 205 in an axial direction of the wheel body 100, but also the visible spaces 205 can be recognized visually when a viewer sees them on an axial outside of the wheel body 100.

Therefore, the present wheel according to Example No. 6 operates and effects advantages in the same as the present wheel according to Example No. 4. In addition thereto, the present wheel according to Example No. 6 comprises the decorated members 200 that are fastened more firmly to the wheel body 100, because the bolts 300 and nut 301 tighten both outside members 201 and inside members 202 securely to the wheel body 100.

Having now fully described the present invention, it will be apparent to one of ordinary skill in the art that many changes and modifications can be made thereto without departing from the spirit or scope of the present invention as set forth herein including the appended claims.

What is claimed is:

1. A wheel for vehicle, said wheel comprising:
    a one-piece wheel body having an integrally formed rim, hub, and plurality of spokes connecting the hub and the rim;
    a decorative member retained to the wheel body and disposed on a surface of at least one spoke of the plurality of spokes;
    a visible space being defined by the decorative member and the surface of the at least one spoke;
    a tongue extending from the rim and arranged between the at least one spoke and the decorative member, the tongue extending toward a central axis of the rim and having a hole therein; and
    the decorative member having an end fastened to the tongue from a rear surface of the at least one spoke by a decorative member fastening bolt,
    wherein both the decorative member and the at least one spoke are visible from an axial outer side of the wheel body, and the decorative member fastening bolt is not visible from the axial outer side of the wheel body.

2. The wheel according to claim 1, wherein the decorative member has walls covering the tongue of the rim and extending in an axial direction of the wheel body.

3. The wheel according to claim 2, further comprising:
    a boss member disposed on a rear surface of the decorative member, the boss member extending toward the at least one spoke and having a thickness sufficient for receiving and holding a threaded end of the decorative member fastening bolt,
    wherein the walls cover the tongue and the boss.

4. The wheel according to claim 3, wherein the walls extend downward to a position at which the tongue is located.

5. The wheel according to claim 1, wherein the decorative member is made from a hard resin selected from the group consisting of acrylonitrile-butadiene-styrene (ABS) resin, polypropylene (PP) resin, polyamide (PA) resin, and polycarbonate-ABS alloy resin.

6. The wheel according to claim 1, further comprising a surface layer covering the decorative member formed by one of electroless plating and vapor deposition and coating.

* * * * *